(12) United States Patent
Zhou et al.

(10) Patent No.: US 10,533,518 B2
(45) Date of Patent: Jan. 14, 2020

(54) INTERNAL COMBUSTION ENGINE HAVING INDEPENDENT COMBUSTION CHAMBER

(71) Applicant: Liuzhou Zijing Technology Transfer Center Co., Ltd., Guangxi (CN)

(72) Inventors: Hu Zhou, Beijing (CN); Hanping Yi, Tianjin (CN)

(73) Assignees: LIUZHOU ZIJING TECHNOLOGY TRANSFER CENTER CO., LTD., Guangxi (CN); Hu Zhou, Beijing (CN)

( * ) Notice: Subject to any disclaimer, the term of this patent is extended or adjusted under 35 U.S.C. 154(b) by 176 days.

(21) Appl. No.: 15/571,044

(22) PCT Filed: Apr. 18, 2016

(86) PCT No.: PCT/CN2016/079527
§ 371 (c)(1),
(2) Date: Nov. 1, 2017

(87) PCT Pub. No.: WO2016/177268
PCT Pub. Date: Nov. 10, 2016

(65) Prior Publication Data
US 2018/0163662 A1    Jun. 14, 2018

(30) Foreign Application Priority Data

May 2, 2015    (CN) .......................... 2015 1 0216187

(51) Int. Cl.
*F02G 3/02*    (2006.01)
*F02F 1/00*    (2006.01)
(Continued)

(52) U.S. Cl.
CPC ................ *F02G 3/02* (2013.01); *F02F 1/004* (2013.01); *F02F 1/18* (2013.01); *F02M 37/08* (2013.01);
(Continued)

(58) Field of Classification Search
CPC .... F02G 3/02; F02G 2270/85; F02G 2258/20; F02G 2270/02; F02G 2254/10;
(Continued)

(56) References Cited

U.S. PATENT DOCUMENTS 4,738,236 A * 4/1988 Kawamura ......... F02B 23/0603
123/276
5,381,660 A * 1/1995 Loving .................... F01N 3/26
60/303

(Continued)

FOREIGN PATENT DOCUMENTS

CN    2349360        11/1999
CN    2349360 Y  *  11/1999
(Continued)

OTHER PUBLICATIONS

"International Search Report (Form PCT/ISA/210)", dated Jul. 1, 2016, with English translation thereof, pp. 1-4.

*Primary Examiner* — Jacob M Amick
*Assistant Examiner* — Charles Brauch
(74) *Attorney, Agent, or Firm* — Gokalp Bayramoglu

(57) ABSTRACT

An internal combustion engine having an independent combustion chamber comprises a combustion chamber (1), an air inlet system (2), a material feeding system (3), and a working system (4). The air inlet system (2) and the combustion chamber (1) are connected together and configured to transport a compressed air to the combustion chamber (1). The material feeding system (3) and the combustion chamber (1) are connected together and configured to transport a fuel to the combustion chamber (1). The combustion chamber (1) has a fixed volume and has no movable wall such as a piston. The fuel continues to be burned in the combustion chamber (1) to generate a high-temperature and high-pressure gas, and chemical energy of the fuel is converted into internal energy of the high-temperature and high-pressure (Continued)

gas. The working system (4) and the combustion chamber (1) are connected together. The piston (21) of the working system (4) works to convert the internal energy of the gas into a mechanical energy.

10 Claims, 1 Drawing Sheet

(51) Int. Cl.
*F02F 1/18* (2006.01)
*F02M 37/08* (2006.01)
*F02B 33/06* (2006.01)
*F02B 23/10* (2006.01)

(52) U.S. Cl.
CPC ............... *F02B 23/10* (2013.01); *F02B 33/06* (2013.01); *F02G 2254/10* (2013.01); *F02G 2258/20* (2013.01); *F02G 2270/02* (2013.01); *F02G 2270/55* (2013.01); *F02G 2270/85* (2013.01); *Y02T 10/125* (2013.01)

(58) Field of Classification Search
CPC ...... F02G 2270/55; F02B 33/06; F02B 23/10; F02F 1/004; F02F 1/18; F02M 37/08; Y02T 10/125
See application file for complete search history.

(56) References Cited

U.S. PATENT DOCUMENTS

| | | | | |
|---|---|---|---|---|
| 6,044,823 A | * | 4/2000 | Watanabe | ............ F02D 41/345 |
| | | | | 123/490 |
| 2001/0045093 A1 | * | 11/2001 | Jacobson | ................. F01D 1/30 |
| | | | | 60/602 |
| 2004/0226523 A1 | | 11/2004 | Kreuter et al. | |

FOREIGN PATENT DOCUMENTS

| | | |
|---|---|---|
| CN | 101566095 | 10/2009 |
| CN | 102536428 | 7/2012 |
| CN | 102966430 | 3/2013 |
| CN | 104819048 | 8/2015 |

* cited by examiner

INTERNAL COMBUSTION ENGINE HAVING INDEPENDENT COMBUSTION CHAMBER

CROSS-REFERENCE TO RELATED APPLICATION

This application is a 371 of international application of PCT application serial no. PCT/CN2016/079527, filed on Apr. 18, 2016, which claims the priority benefit of China application no. 201510216187.3, filed on May 2, 2015. The entirety of each of the above-mentioned patent applications is hereby incorporated by reference herein and made a part of this specification.

BACKGROUND

Technical Field

The present invention relates to an internal combustion engine, in particular to an internal combustion engine having an independent combustion chamber.

Description of Related Art

A common piston type internal combustion engine is not provided with an independent combustion chamber, fuel is burned in a cylinder to push a piston to work outwards, the energy utilization efficiency of the internal combustion engine is generally 20-40% and can hardly be further improved. The main reason is that the compression ratio and the combustion initial temperature can hardly be further increased.

Fuel is intermittently burned in combustion chambers of common piston-working internal combustion engines. The phenomenon of knocking is likely to be caused if the compression ratio and the combustion initial temperature are increased, and consequentially, the internal combustion engines can be damaged.

SUMMARY

The present invention aims to provide an internal combustion engine according to which the compression ratio and the combustion initial temperature can be increased without causing knocking damage to a working air chamber. The internal combustion engine of the present invention adopts an independent combustion chamber that is made of high-temperature-resistant and high-pressure-resistant materials. Fuel is burned continuously in the combustion chamber to generate a high-temperature and high-pressure gas, and damage to the internal combustion engine caused by the knocking phenomenon is avoided. The internal combustion engine of the present invention is composed of a combustion chamber, an air inlet system, a material feeding system and a working system. The air inlet system is connected with the combustion chamber and configured to transport a compressed air to the combustion chamber. The material feeding system is connected with the combustion chamber and configured to transport a fuel to the combustion chamber. The combustion chamber has a fixed volume and has no movable wall such as a piston. The fuel continues to be burned in the combustion chamber to generate a high-temperature and high-pressure gas, and a chemical energy of the fuel is converted into an internal energy of the high-temperature and high-pressure gas. The working system is connected with the combustion chamber, and the piston of the working system works to convert the internal energy of the gas into a mechanical energy.

The combustion chamber is made of high-temperature-resistant and high-pressure-resistant materials. The high-temperature-resistant and high-pressure-resistant materials can be a high-temperature-resistant special steel, can also be a high-temperature-resistant ceramic, can also be a high-temperature-resistant composite materials, and particularly can be a carbon fiber-ceramic composite materials. The combustion chamber is in the high-temperature and high-pressure state all the time while in work. Furthermore, the outer wall of the combustion chamber can be covered with heat-insulation materials, the inner wall of the combustion chamber can be coated with fireproof heat-insulation materials, and thus heat loss is avoided.

The air inlet system is composed of an air compression system, an air inlet pipeline and an air inlet valve. The air compression system can be linked with the working system and can also work independently. The air compression system can be a single-stage compression system or a multi-stage compression system, and can also be a piston type air compression system or a centrifugal air compression system. The piston type air compression system can be a reciprocating piston type air compression system and can also be a rotor piston type air compression system. The air compression system linked with the working system can be coaxial with the working system and can also not be coaxial with the working system. The reciprocating piston type air compression system linked with the working system can be provided with an independent compression cylinder and can also be provided with a compression cylinder integrally connected with a working cylinder of the working system. The air compression system working independently can be an electric air compression system and can also be an independent internal combustion engine air compression system. The air inlet system can also be provided with a compressed air buffering device between the air compression system and the air inlet valve. The buffering device can be provided with a heating device, the heating device is used for pre-heating the compressed air of the buffering device, and the preheated compressed air enters the combustion chamber through the air inlet valve. The heat of the heating device is from the tail gas exhausted by the working system.

The material feeding system is mainly composed of a fuel storage device and a material feeding pump. Fuel can be liquid fuel and can also be gaseous fuel. The material feeding pump can be a continuous material feeding pump and can also be a pulse material feeding pump, and the material feeding pump can be independent and can also be linked with the working system. The independent material feeding pump can be an electric material feeding pump and can also be a pneumatic material feeding pump. The material feeding pump can be directly connected with the combustion chamber through a material feeding valve, or the material feeding pump is connected with a buffering and heating device and then connected with the combustion chamber through a material feeding valve. According to the material feeding system provided with the buffering and heating device, fuel enters the buffering and heating device through the material feeding pump, the fuel in the buffering device is pre-heated through the buffering and heating device, and the pre-heated fuel enters the combustion chamber through the material feeding valve. The heat of the buffering and heating device is from the tail gas exhausted by the working system.

The working system converts internal energy into mechanical energy, and can be a reciprocating piston type working system, and can also be a rotor piston type working system. The reciprocating piston type working system can be a single-cylinder system and can also be a multi-cylinder system. The multiple cylinders can be aligned linearly or oppositely and can also be arranged in a V shape. The reciprocating piston type working system has only two strokes, one is a working stroke and the other one is an exhausting stroke. Each air chamber provided with a working piston has an independent air inlet control valve, and the flow rate and on-off time of the high-temperature and high-pressure airflow can be controlled according to the requirements.

According to the working principle of the internal combustion engine of the present invention: the air inlet system transports the compressed air to the combustion chamber, the material feeding system transports the fuel to the combustion chamber, the fuel is burned in the combustion chamber, the chemical energy of the fuel is converted into the internal energy of the high-temperature and high-pressure gas, and the piston of the working system works to convert the internal energy of the high-temperature and high-pressure gas into the mechanical energy. The internal combustion engine continues to work, the air inlet system continues to provide the compressed air with the pressure intensity higher than the pressure intensity in the combustion chamber, and the material feeding system continues to provide the fuel with the pressure intensity higher than the pressure intensity in the combustion chamber.

The internal combustion engine of the present invention is relatively simple in structure and extremely convenient to control, the fuel combustion efficiency is high, and the output power density is high.

Wherein, 1—combustion chamber, 2—air inlet system, 3—material feeding system, 4—working system, 5—air inlet valve, 6—material feeding valve, 7—working valve, 8—igniter.

Figure 1:
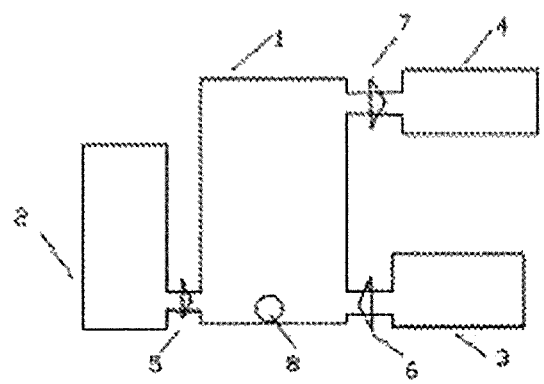
FIG. 1 is a schematic diagram of an internal combustion engine having an independent combustion chamber.
Figure 2:
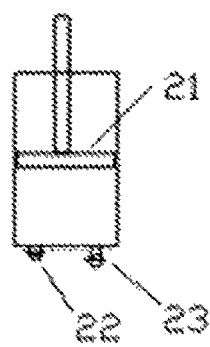

FIG. 2 is a schematic diagram of a working air chamber having an independent air inlet control valve.

Wherein, 21—working piston, 22—exhaust valve, 23—air inlet valve.

Figure 3:
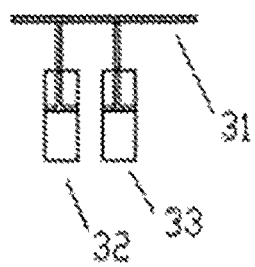

FIG. 3 is a schematic diagram of a working system and an air compression system in coaxial linkage, Wherein, 31—main shaft shared by the working system and the air compression system, 32—air compression cylinder of the air inlet system, 33—working cylinder of the working system.

Figure 4:
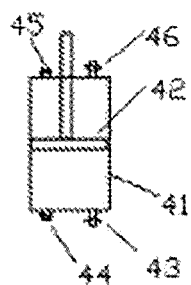

FIG. 4 is a schematic diagram of integrally-connected cylinders and pistons of the working system and the air compression system, Wherein, 41—integrally-connected cylinders of the working system and the air compression system, 42—integrally-connected pistons of the working system and the air compression system, 43—waste gas exhaust valve of the working system, 44—high-pressure gas inlet valve of the working system, 45—natural air inlet valve of the air inlet system, 46—compressed air outlet valve of the air inlet system

DETAILED DESCRIPTION

Best Embodiment for Implementing the Present Invention
Best Mode of the Present Invention
An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a rotor piston type working system, the air inlet system 2 is a single-stage rotor piston type air compression system linked with the working system 4, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 1

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a single-cylinder reciprocating piston type working system, the air inlet system 2 is a single-cylinder reciprocating piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 2

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple cylinders arranged in a V shape, the air inlet system 2 is a multi-cylinder single-stage reciprocating piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 3

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a multi-cylinder single-stage reciprocating piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 4

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a rotor piston type working system, the air inlet system 2 is a single-stage rotor piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 5

An internal combustion engine of the present invention is composed of a combustion chamber 1, an air inlet system 2, a material feeding system 3 and a working system 4, the combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a multi-cylinder multi-stage reciprocating piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 6

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a rotor piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 7

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a centrifugal air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 8

An internal combustion engine of the present invention is composed of a combustion chamber 1, an air inlet system 2, a material feeding system 3 and a working system 4, the combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is an independent electric centrifugal air compression system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 9

An internal combustion engine of the present invention is composed of a combustion chamber 1, an air inlet system 2, a material feeding system 3 and a working system 4, the combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is an independent electric single-stage reciprocating piston type air compression system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 10

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is an independent electric multi-stage reciprocating piston type air compression system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 11

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is an independent electric rotor piston type air compression system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 12

An internal combustion engine of the present invention is composed of a combustion chamber 1, an air inlet system 2, a material feeding system 3 and a working system 4, the combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is an independent internal combustion engine air compression system, the material feeding system 3 is an independent electric liquid fuel continuous feeding system, and the combustion chamber 1 is a high-temperature-resistant alloy combustion chamber with the inner wall coated with a fireproof heat-insulation coating.

Embodiment 13

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric liquid fuel pulse feeding system, and the combustion chamber 1 is a high-temperature-resistant alloy combustion chamber with the inner wall coated with a fireproof heat-insulation coating.

Embodiment 14

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is a liquid fuel continuous feeding system in mechanical linkage with the working system, and the combustion chamber 1 is a high-temperature-resistant alloy combustion chamber with the inner wall coated with a fireproof heat-insulation coating.

Embodiment 15

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is a liquid fuel pulse feeding system in mechanical linkage with the working system, and the combustion chamber 1 is a high-temperature-resistant alloy combustion chamber with the inner wall coated with a fireproof heat-insulation coating.

Embodiment 16

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric gaseous fuel continuous feeding system, and the combustion chamber 1 is a high-temperature-resistant alloy combustion chamber with the inner wall coated with a fireproof heat-insulation coating.

Embodiment 17

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric gaseous fuel pulse feeding system, and the combustion chamber 1 is a high-temperature-resistant alloy combustion chamber with the inner wall coated with a fireproof heat-insulation coating.

Embodiment 18

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is a gaseous fuel continuous feeding system in mechanical linkage with the working system, and the combustion chamber 1 is a high-temperature-resistant alloy combustion chamber with the inner wall coated with a fireproof heat-insulation coating.

Embodiment 19

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is a gaseous fuel pulse feeding system in mechanical linkage with the working system, and the combustion chamber 1 is a high-temperature-resistant alloy combustion chamber with the inner wall coated with a fireproof heat-insulation coating.

Embodiment 20

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric liquid fuel continuous feeding system, and the combustion chamber 1 is a high-temperature-resistant ceramic combustion chamber.

Embodiment 21

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric liquid fuel continuous feeding system, and the combustion chamber 1 is a high-temperature-resistant ceramic combustion chamber and is covered with heat-insulation materials.

Embodiment 22

An internal combustion engine of the present invention is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric liquid fuel continuous feeding system, and the combustion chamber 1 is a ceramic-carbon fiber composite combustion chamber and is covered with heat-insulation materials.

Embodiment 23

An internal combustion engine of the present invention is composed of an internal combustion engine body and a power generator. The internal combustion engine body is composed of a combustion chamber 1, an air inlet system 2, a material feeding system 3 and a working system 4. The combustion chamber 1 has a fixed volume, and an igniter 8 is arranged in the combustion chamber 1. The air inlet system 2 is connected with the combustion chamber 1 through an air inlet valve 5. The material feeding system 3 is connected with the combustion chamber 1 through a material feeding valve 6. The working system 4 is connected with the combustion chamber 1 through a working valve 7. The working system 4 is a reciprocating piston type working system provided with multiple linearly-aligned cylinders, the air inlet system 2 is a single-stage multi-cylinder reciprocating piston type air compression system linked with the working system, the material feeding system 3 is an independent electric liquid fuel continuous feeding system, and the combustion chamber 1 is a high-temperature-resistant alloy combustion chamber with the inner wall coated with a fireproof heat-insulation coating and is covered with heat-insulation materials. The power generator and internal combustion engine body are coaxial.

The above embodiments are only partial applications of the present invention, more combinations can be formed by different combustion chambers, different air inlet systems, different material feeding systems and different working systems, and all the combinations can realize the present invention. The internal combustion engine of the present invention can have a higher air compression ratio and a higher initial temperature, the output power can be better adjusted by controlling the working valve, and more energy can be saved.

INDUSTRIAL APPLICATIONS

The internal combustion engine of the present invention can serve as an engine of a motor vehicle and can also serve as a power source of a power generator.

What is claimed is:

1. A piston type internal combustion engine, comprising a combustion chamber, an air inlet system, a material feeding system and a working system,
wherein
    the air inlet system, the material feeding system and the working system are all connected with the combustion chamber,
    the space in the combustion chamber is fixed,
    the combustion chamber and the working system are separated spatially,
    chemical energy of a fuel is converted into an internal energy in the combustion chamber,
    a working medium works through the working system to convert the internal energy into a mechanical energy,
    the combustion chamber is in the high-temperature and high-pressure state all the time in work,
    a pressure intensity of intake air is higher than a pressure intensity of the working medium, and
    the air inlet system and the material feeding system are separately connected to the combustion chamber and are located on opposite sides of the combustion chamber.

2. The internal combustion engine according to claim 1, wherein an outer wall of the combustion chamber is covered with heat-insulation materials for heat preservation.

3. The internal combustion engine according to claim 1, wherein an inner wall of the combustion chamber is coated with fireproof heat-insulation materials.

4. The internal combustion engine according to claim 1, wherein an air compression system and the working system are linked and share a main shaft.

5. The internal combustion engine according to claim 1, wherein the material feeding system is an independent electric material feeding system.

6. The internal combustion engine according to claim 1, wherein a working air chamber is provided with an independent control valve.

7. The internal combustion engine according to claim 6, wherein both the working system and an air compression system are reciprocating piston type systems, and cylinders of the air compression system and the working system are integrally connected.

8. The internal combustion engine according to claim 1, wherein a compressed air buffering device is arranged between an air compressor of the air inlet system and the combustion chamber.

9. The internal combustion engine according to claim 8, wherein the compressed air buffering device has a heating function, and heat of the compressed air buffering device is from a gas exhausted by the working system.

10. An internal combustion power generator, wherein a generated power of the internal combustion power generator is from the internal combustion engine of claim 1.

* * * * *